United States Patent
Behling et al.

(10) Patent No.: US 10,547,127 B2
(45) Date of Patent: Jan. 28, 2020

(54) ELECTRICAL TERMINAL DEVICE

(71) Applicant: Hamilton Sundstrand Corporation, Charlotte, NC (US)

(72) Inventors: David S. Behling, Belvidere, IL (US); Glenn C. Lemmers, Jr., Loves Park, IL (US); Dhaval Patel, Loves Park, IL (US); Alan Kasner, Long Grove, IL (US); Douglas J. Turner, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/689,041

(22) Filed: Aug. 29, 2017

(65) Prior Publication Data
US 2019/0067840 A1 Feb. 28, 2019

(51) Int. Cl.
*H01R 9/24* (2006.01)
*H02K 5/22* (2006.01)
*H02B 1/28* (2006.01)

(52) U.S. Cl.
CPC .............. *H01R 9/24* (2013.01); *H02B 1/28* (2013.01); *H02K 5/225* (2013.01)

(58) Field of Classification Search
CPC .................................... H01R 9/24; H02B 1/28
USPC ........................................................ 439/709
See application file for complete search history.

(56) References Cited

U.S. PATENT DOCUMENTS

| | | | | |
|---|---|---|---|---|
| 3,707,637 A * | 12/1972 | Charlton | ............... | H02K 5/225 310/71 |
| 4,735,576 A | 4/1988 | Tanaka et al. | | |
| 4,880,391 A * | 11/1989 | Hurtgen | ................. | H01R 29/00 439/221 |
| 5,007,156 A * | 4/1991 | Hurtgen | ................. | H01R 29/00 29/596 |
| 5,266,761 A * | 11/1993 | Fisher | .................... | H01H 35/10 200/302.1 |
| 5,284,977 A | 2/1994 | Imori et al. | | |
| 5,408,154 A * | 4/1995 | Meiser | ................ | B25J 17/0241 174/50.52 |
| 5,861,689 A * | 1/1999 | Snider | .................... | H02K 3/522 310/71 |

(Continued)

FOREIGN PATENT DOCUMENTS

| | | |
|---|---|---|
| CN | 203386962 U | 1/2014 |
| JP | S55117784 U | 2/1980 |
| KR | 101158528 B1 | 6/2012 |

OTHER PUBLICATIONS

European Search Report regarding Application No. 18190576.1 dated Jan. 4, 2019; 8 pages.

*Primary Examiner* — Alexander Gilman
(74) *Attorney, Agent, or Firm* — Cantor Colburn LLP

(57) ABSTRACT

An electrical terminal device adapted to mount to a structure, and including a electrically non-conductive substructure, an electrically non-conductive cover, a heat resistant shroud, and an electric terminal. The substructure is in contact with the structure. The cover is engaged to the substructure. The substructure and the cover define a chamber, and the substructure defines, at least in-part, a sealed passage in communication with the chamber. The heat resistant shroud substantially covers the cover. The cover is substantially located between the shroud and the substructure. The electric terminal is located in the chamber and is attached to the substructure.

10 Claims, 3 Drawing Sheets

(56) References Cited

U.S. PATENT DOCUMENTS

| | | | | |
|---|---|---|---|---|
| 6,284,977 B1 * | 9/2001 | Boron | H01R 13/533 | 174/88 R |
| 6,318,734 B1 * | 11/2001 | Boskamp | F01N 13/10 | 277/591 |
| 6,674,198 B2 * | 1/2004 | Gubbels | H02K 5/00 | 310/51 |
| 6,684,759 B1 * | 2/2004 | Gorokhovsky | C23C 16/458 | 219/430 |
| 6,824,432 B2 * | 11/2004 | Katsuzawa | H02K 5/225 | 439/709 |
| 6,933,638 B2 * | 8/2005 | Hirth | H02K 5/225 | 310/62 |
| 7,122,928 B2 * | 10/2006 | Shindo | B60R 16/0239 | 310/89 |
| 7,420,302 B2 * | 9/2008 | Archer | H02K 5/15 | 310/68 R |
| 7,435,128 B2 * | 10/2008 | Powell | H01R 4/2433 | 439/403 |
| 7,740,500 B2 * | 6/2010 | Rudolph | H01R 13/506 | 439/372 |
| 7,923,875 B2 * | 4/2011 | Henry | H02K 5/225 | 310/64 |
| 8,084,903 B2 * | 12/2011 | Goetze | H02K 5/225 | 310/68 D |
| 8,446,058 B2 * | 5/2013 | Avula | H02K 5/225 | 310/71 |
| 9,338,907 B2 * | 5/2016 | Bell | H05K 7/20918 | |
| 10,292,281 B2 * | 5/2019 | Saito | B60R 16/02 | |
| 2015/0244097 A1 * | 8/2015 | Hirayama | H01R 13/405 | 439/660 |
| 2016/0258322 A1 * | 9/2016 | Winn | F01D 25/145 | |
| 2017/0009620 A1 * | 1/2017 | Socha | F01M 5/002 | |
| 2018/0094545 A1 * | 4/2018 | Dale | F01D 25/30 | |
| 2018/0238410 A1 * | 8/2018 | Hori | C21D 6/00 | |

* cited by examiner

ELECTRICAL TERMINAL DEVICE

BACKGROUND

The present disclosure relates to an aircraft generator assembly, and more particularly, to an electrical terminal device of the aircraft generator assembly.

Electrical terminal devices are known to include terminal blocks and covers having electrical insulating properties to protect internal terminal connections and electrical conductors. Materials that include such electrical insulating properties may not possess heat resistant properties.

BRIEF DESCRIPTION

An electrical terminal device adapted to mount to a structure, the electrical terminal assembly according to one, non-limiting, embodiment of the present disclosure includes an electrically non-conductive substructure in contact with the structure; an electrically non-conductive cover engaged to the substructure, wherein the substructure and the cover define a chamber and the substructure defines at least in-part a sealed passage in communication with the chamber; a heat resistant shroud substantially covering the cover, wherein the cover is substantially located between the shroud and the substructure; and an electric terminal located in the chamber and attached to the substructure.

Additionally to the foregoing embodiment, the heat resistant shroud is made of a material capable of withstanding temperatures of about, or greater than, two thousand degrees Fahrenheit for a time period in excess of fifteen minutes.

In the alternative or additionally thereto, in the foregoing embodiment, the heat resistant shroud is made of Inconnel.

In the alternative or additionally thereto, in the foregoing embodiment, the heat resistant shroud is made of stainless steel.

In the alternative or additionally thereto, in the foregoing embodiment, the heat resistant shroud is made of a nickel-chrome alloy.

In the alternative or additionally thereto, in the foregoing embodiment, the electrical terminal device includes at least one fastener extending through the heat resistant shroud, the cover, and the substructure, and projecting into the structure for engaging the electrical terminal assembly to the structure.

In the alternative or additionally thereto, in the foregoing embodiment, the at least one fastener is a threaded bolt.

In the alternative or additionally thereto, in the foregoing embodiment, the substructure includes a base defining the at least in-part the sealed passage and at least one partition projecting outward from the base, and wherein each one of the at least one partition includes a longitudinal distal end and the cover is in contact with the longitudinal distal end.

In the alternative or additionally thereto, in the foregoing embodiment, the cover, the base and adjacent partitions of the at least one partition define a first opening.

In the alternative or additionally thereto, in the foregoing embodiment, the cover is at least in-part disposed between a central portion of the shroud and the substructure, and the shroud includes a peripheral sidewall projecting from and disposed substantially normal to the central portion, the peripheral sidewall including opposite end segments, and wherein the opposite end segments and the central portion define a second opening aligned to and in direct communication with the first opening.

An aircraft electric generator assembly according to another, non-limiting, embodiment includes an electric generator; and an electrical terminal device including an electrically non-conductive substructure attached to the electric generator and a metallic shroud adapted to at least in-part cover the electrically non-conductive substructure.

Additionally to the foregoing embodiment, the electrical terminal device includes an electrically non-conductive cover disposed between the electrically non-conductive substructure and the metallic shroud.

In the alternative or additionally thereto, in the foregoing embodiment, the metallic shroud is substantially spaced from the electrically non-conductive cover.

In the alternative or additionally thereto, in the foregoing embodiment, the aircraft electric generator assembly includes an electric conductor including a first segment extending through a sealed passage defined by the electric generator and the substructure for connection to a terminal of the electrical terminal device, and a second segment connecting to the terminal and extending through an opening in the shroud.

In the alternative or additionally thereto, in the foregoing embodiment, the shroud includes a central portion and a peripheral sidewall having opposite end segments, and the opposite end segments and the central portion define the opening.

In the alternative or additionally thereto, in the foregoing embodiment, the shroud is made of a material capable of withstanding temperatures of about, or greater than, two thousand degrees Fahrenheit for a time period in excess of fifteen minutes.

In the alternative or additionally thereto, in the foregoing embodiment, the shroud is made of Inconnel.

In the alternative or additionally thereto, in the foregoing embodiment, the shroud is made of stainless steel.

In the alternative or additionally thereto, in the foregoing embodiment, the shroud is made of a nickel-chrome alloy.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
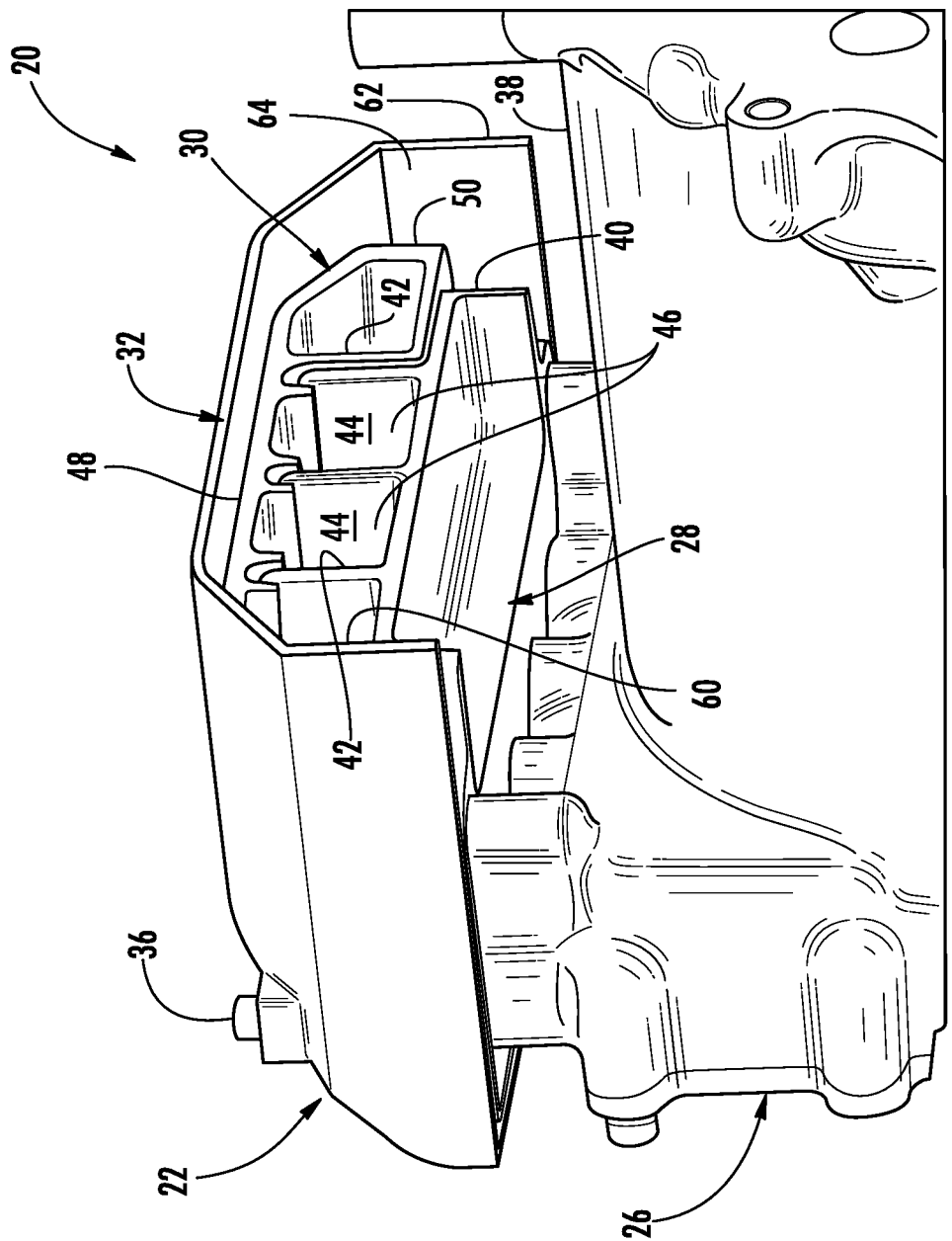
FIG. 1 is a perspective view of an aircraft generator assembly as one exemplary embodiment of an application for an electrical terminal device.

Referring to FIG. 1, an aircraft generator assembly 20 is illustrated as one, non-limiting application for an electrical terminal device 22. The aircraft generator assembly 20 may include the electrical terminal device 22, at least one electrical conductor or feeder 24 (see FIG. 2), and an electrical generator 26 that may be driven by an engine (not shown). With the generator 26 being driven by the engine, the electrical conductors 24 provide the electrical power to various loads of the aircraft. The aircraft generator assembly 20, and/or the electrical terminal device 22, may be designed to meet various governmental regulations including regulations associated with flame retardation and heat resistance.

Figure 2:
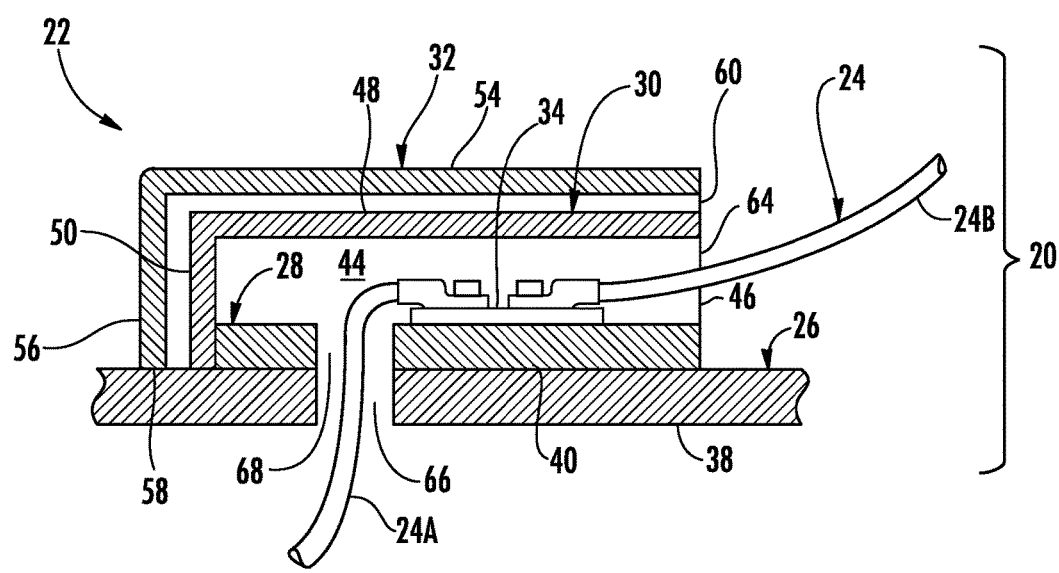
FIG. 2 is a cross section of the electrical terminal device illustrating a conductor connected to a terminal of the electrical terminal device.

Referring to FIGS. 1 and 2, the electrical terminal device 22 may include a substructure 28 (i.e., terminal block), a cover 30, a shroud 32, at least one electrical terminal 34, and at least one fastener 36. The terminal 34 may generally secure to the substructure 28 and is adapted to electrically connect segments 24A, 24B of the conductor 24 as is generally known by one skilled in the art. The substructure 28 may attach to an outer housing 38 of the generator 26. The housing 38 may define an opening 40 for routing of the conductor segment 24A from the terminal 34 and to internal component(s) of the generator 26 without generally exposing the conductor segment to the outer/surrounding environment. It is contemplated and understood that the electrical terminal device 22 may be applied to other electrical components other than the generator 26. In such applications, the housing 38 may be any structure conveniently located for the particular application.

The substructure 28 may be, at least in-part, located between the generator housing 38 and the cover 30 such that the cover 30 generally covers the substructure 28 to electrically protect the terminal 34 (e.g., electrical shorts). The cover 30 may be located, at least in-part, between the substructure 28 and the shroud 32, such that the shroud 32 functions as a heat shield to protect the cover 30, the substructure 28, and the terminal 34 from excessive heat and flame. The fastener 36 may generally extend through the shroud 32, the cover 30, and the substructure 28, and into the generator housing 38 to generally hold the electrical terminal device 22 together, and attach the electrical terminal device 22 to the generator 26. In one example, the fastener 36 may be a treaded bolt that threads into the housing 38.

The substructure 28 and the cover 30 may be electrically non-conductive to prevent electrical faults. In one example, the substructure 28 may be one homogeneous piece that may be molded. Similarly, the cover 30 may be one homogeneous piece that may be molded. The shroud 32 is made of a heat resistant material that may be capable of withstanding temperatures of about two thousand degrees Fahrenheit or greater. In one example, the shroud 32 may be metallic, and/or may be made of stainless steel, Inconnel, a nickel-chrome alloy, and others. The substructure 28 and the cover 30 may be made of an electrically non-conductive material that may be a polymer or thermoplastic (e.g., Torlon® by Solvay Inc.).

The substructure 28 of the electrical terminal device 22 may include a base 40 and a plurality of partitions 42 (i.e., three illustrated in FIG. 1) projecting outward (i.e., upward as illustrated) from the base 40 and disposed substantially normal thereto. The base 40 may be substantially planar and is in contact with the generator housing 38. A plurality of terminal chambers 44 may be defined by the base 40, the cover 30 and the adjacent partitions 42. Each chamber 44 may generally communicate with the outer environment via respective openings 46 for routing of the respective conductor segments 24B out and away from the generator assembly 20.

The cover 30 of the electrical terminal device 22 may be generally shaped like a scoop having a central segment 48 and a peripheral sidewall 50. When assembled, the peripheral sidewall 50 projects away from the central segment 48 and generally attaches to the base 40 of the substructure 28. The central segment 48 may be spaced from and substantially parallel to the base 40, and is in contact with, and spans across, longitudinal distal ends 52 (i.e., edges) of the partitions 42.

The shroud 32 of the electrical terminal device 22 may be generally shaped like a scoop having a central portion 54 and a peripheral sidewall 56. When assembled, the peripheral sidewall 56 projects away from, and is at least in part substantially normal to, the central portion 48. A distal edge 58 of the sidewall 56 may be in contact with, or close proximity to, the base 40 of the substructure 28. To enhance thermal protection of the cover 30 by the shroud 32, the shroud 32 may be spaced from the cover 30 except for selected and limited locations. One such location may be where the fastener 36 connects the terminal device 22 together.

The peripheral sidewall 56 of the shroud 32 may include opposite end segments 60, 62 (see FIG. 1) generally spaced apart from one-another by the openings 46. More specifically, the shroud 32 may include an opening 64 that is generally defined by the end segments 60, 62 and a distal edge of the central portion 54. The opening 64 may be in direct communication with the plurality of openings 46 for routing of the conductor segments 24B to external electrical component. In one embodiment, the opening 64 may be limited in size to optimize the heat resistant capability of the shroud 32.

Figure 3:
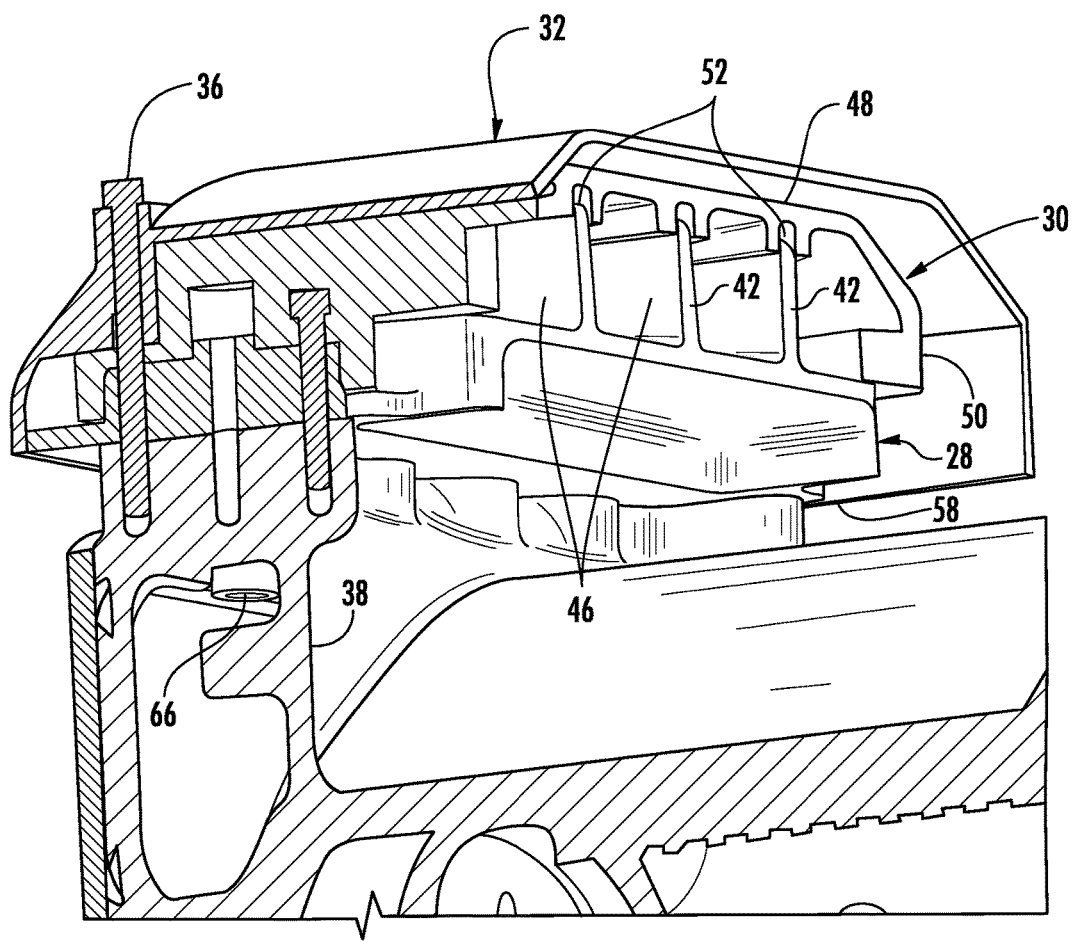
FIG. 3 is a cross sectional perspective view of the aircraft generator assembly illustrating a fastener connecting the electrical terminal device to a generator of the aircraft generator assembly.

Referring to FIGS. 2 and 3, when the generator assembly 20 is fully assembled, the conductor segment 24A may be concealed from the external environment and routed through holes 66, 68 (i.e., a sealed passage) in the respective generator housing 38 and base 40 of the substructure 28 for connection to the terminal 34 that is electrically insulated/protected by the substructure 28 and the cover 30. The conductor segment 24B is also connected to the terminal 34 within the chamber 44, and is routed through the opening 46 defined by the substructure 28 and cover 30, and through the aligned opening 64 defined by the shroud 32.

Advantages and benefits of the present disclosure include a terminal device that is robust and/or capability of meeting stringent government regulations.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electrical terminal device adapted to mount to a structure, the electrical terminal device, comprising:
   an electrically non-conductive substructure in contact with the structure;
   an electrically non-conductive cover engaged to the substructure, wherein the substructure and the cover define a chamber and the substructure defines at least in-part a sealed passage in communication with the chamber;
   a heat resistant shroud substantially surrounding the cover, wherein the cover is substantially located between the shroud and the substructure; and
   an electric terminal located in the chamber and attached to the sub structure.

2. The electrical terminal device set forth in claim 1, wherein the heat resistant shroud is made of a material capable of withstanding temperatures of about, or greater than, two thousand degrees Fahrenheit for a time period in excess of fifteen minutes.

3. The electrical terminal device set forth in claim 2, wherein the heat resistant shroud is made of Inconnel.

4. The electrical terminal device set forth in claim 2, wherein the heat resistant shroud is made of stainless steel.

5. The electrical terminal device set forth in claim 2, wherein the heat resistant shroud is made of a nickel-chrome alloy.

6. The electrical terminal device set forth in claim 1, further comprising:
   at least one fastener extending through the heat resistant shroud, the cover, and the substructure, and projecting into the structure for engaging the electrical terminal device to the structure.

7. The electrical terminal device set forth in claim 6, wherein the at least one fastener is a threaded bolt.

8. The electrical terminal device set forth in claim 1, wherein the substructure includes a base defining at least in-part the sealed passage and at least one partition projecting outward from the base, and wherein each one of the at least one partition includes a longitudinal distal end and the cover is in contact with the longitudinal distal end.

9. The electrical terminal device set forth in claim 8, wherein the cover, the base and adjacent partitions of the at least one partition define a first opening.

10. The electrical terminal device set forth in claim 9, wherein the cover is at least in-part disposed between a central portion of the shroud and the substructure, and the shroud includes a peripheral sidewall projecting from and disposed substantially normal to the central portion, the peripheral sidewall including opposite end segments, and wherein the opposite end segments and the central portion define a second opening aligned to and in direct communication with the first opening.

* * * * *